US012802428B2

(12) United States Patent
Zu et al.

(10) Patent No.: US 12,802,428 B2
(45) Date of Patent: Nov. 17, 2026

(54) TARGET DETECTION OPTIMIZATION METHOD AND DEVICE

(71) Applicant: BOE Technology Group Co., Ltd., Beijing (CN)

(72) Inventors: Chunshan Zu, Beijing (CN); Weiyang Hu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 353 days.

(21) Appl. No.: 18/294,134

(22) PCT Filed: Jul. 27, 2022

(86) PCT No.: PCT/CN2022/108189
§ 371 (c)(1),
(2) Date: Jan. 31, 2024

(87) PCT Pub. No.: WO2023/029824
PCT Pub. Date: Mar. 9, 2023

(65) Prior Publication Data
US 2024/0346813 A1 Oct. 17, 2024

(30) Foreign Application Priority Data
Aug. 30, 2021 (CN) ......................... 202111006526.7

(51) Int. Cl.
*G06V 10/82* (2022.01)
*G06F 18/00* (2023.01)
(Continued)

(52) U.S. Cl.
CPC .......... *G06V 10/82* (2022.01); *G06V 10/7715* (2022.01); *G06V 10/776* (2022.01); *G06V 10/806* (2022.01)

(58) Field of Classification Search
CPC .. G06V 10/82; G06V 10/7715; G06V 10/776; G06V 10/806; G06V 10/454;
(Continued)

(56) References Cited

U.S. PATENT DOCUMENTS

2017/0206431 A1* 7/2017 Sun ..................... G06F 16/5838
2019/0205759 A1* 7/2019 Zhang ...................... G06N 3/09
(Continued)

FOREIGN PATENT DOCUMENTS

CN 109657609 A 4/2019
CN 110717574 A * 1/2020 ............. G06N 3/063
(Continued)

OTHER PUBLICATIONS

Zhou, D., Hou, Q., Chen, Y., Feng, J., Yan, S. (2020). Rethinking Bottleneck Structure for Efficient Mobile Network Design. In: Vedaldi, A., Bischof, H., Brox, T., Frahm, JM. (eds) Computer Vision—ECCV 2020. ECCV 2020. Lecture Notes in Computer Science( ), vol. 12348. Springer, Cham. (Year: 2020).*
(Continued)

*Primary Examiner* — Chineyere Wills-Burns
*Assistant Examiner* — Lucius Cameron Green Allen
(74) *Attorney, Agent, or Firm* — IPro, PLLC

(57) ABSTRACT

A target detection optimization method and device are disclosed. The method includes: inputting an image including an object into a trained target detection model for detection, and determining coordinates of the object in the image and a category of the object; the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second
(Continued)

training sample set; where the optimal pruning scheme is obtained by screening pruning schemes determined according to different pruning methods and pruning rates.

15 Claims, 8 Drawing Sheets

(51) Int. Cl.

| | |
|---|---|
| ***G06F 18/214*** | (2023.01) |
| ***G06F 18/2415*** | (2023.01) |
| ***G06F 18/25*** | (2023.01) |
| ***G06N 3/045*** | (2023.01) |
| ***G06N 3/082*** | (2023.01) |
| ***G06V 10/44*** | (2022.01) |
| ***G06V 10/764*** | (2022.01) |
| ***G06V 10/77*** | (2022.01) |
| ***G06V 10/776*** | (2022.01) |
| ***G06V 10/80*** | (2022.01) |

(58) Field of Classification Search
CPC . G06V 10/764; G06F 18/00; G06F 18/24155; G06F 18/253; G06F 18/214; G06N 3/045; G06N 3/082
USPC .......................................................... 382/181
See application file for complete search history.

(56) References Cited

U.S. PATENT DOCUMENTS

2019/0370658 A1* 12/2019 Xie ........................ G06N 3/082
2020/0074247 A1 3/2020 Dubovsky et al.
2020/0210228 A1* 7/2020 Wu ........................ G06F 9/4881
2020/0356860 A1* 11/2020 Kim ........................ G06N 3/09
2021/0065052 A1* 3/2021 Muralidharan .......... G06N 3/04
2021/0150170 A1* 5/2021 Ran ........................ G06N 3/045
2021/0166058 A1* 6/2021 Miao ...................... G06N 3/045
2021/0406691 A1* 12/2021 Jiang ...................... G06N 3/082
2022/0083819 A1* 3/2022 Chadha ..................... G06T 3/20
2022/0086463 A1* 3/2022 Coban ..................... G06T 9/002
2022/0114455 A1* 4/2022 Samek ................... G06N 3/096
2022/0398405 A1* 12/2022 Hassan ................ G06V 20/597
2023/0131518 A1* 4/2023 An ....................... G06V 10/774
382/155
2023/0298382 A1* 9/2023 Liu .................... G06V 10/7715
382/118
2024/0046504 A1* 2/2024 Chen ......................... G06T 7/70

FOREIGN PATENT DOCUMENTS

CN 111008640 A 4/2020
CN 111222433 A 6/2020
CN 111770299 A 10/2020
CN 112699958 A 4/2021
CN 113011588 A 6/2021
CN 113627389 A 11/2021

OTHER PUBLICATIONS

Cai, Yuxuan, et al. "Yolobile: Real-time object detection on mobile devices via compression-compilation co-design." Proceedings of the AAAI conference on artificial intelligence. vol. 35. No. 2. 2021.
Yuxuan Cai et al. "Real-Time Viewing on Mobile Devices Label Detection." AI Deep Learning Perspective. Apr. 10, 2021.
PCT/CN2022/108189 international search report dated Oct. 10, 2022.

* cited by examiner

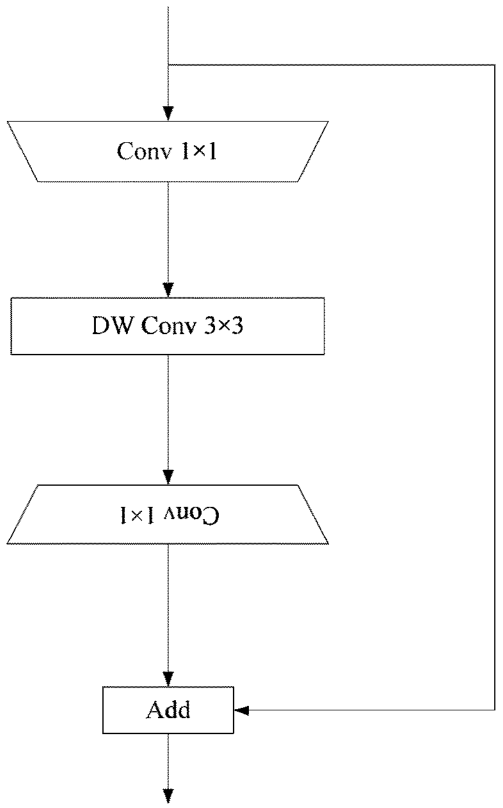

FIG. 1

200 inputting an image including an object into a trained target detection model for detection, determining coordinates of the object in the image and a category of the object;

where the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set; where the optimal pruning scheme is obtained by screening pruning schemes determined from different pruning methods and pruning rates

FIG. 2

TARGET DETECTION OPTIMIZATION METHOD AND DEVICE

CROSS REFERENCE TO RELATED APPLICATION

This application is a National Stage of International Application No. PCT/CN2022/108189, filed on Jul. 27, 2022, which claims priority to Chinese patent application No. 202111006526.7, filed with the China National Intellectual Property Administration on Aug. 30, 2021 and entitled "Target Detection Optimization Method and Device", which is hereby incorporated by reference in its entirety.

TECHNICAL FIELD

The present disclosure relates to the technical field of target detection, and in particular to an optimization method and device for target detection.

BACKGROUND

Target detection is an important branch of image processing and computer vision, and is also the core part of the intelligent monitoring system. At the same time, the target detection is also a basic algorithm in the field of identification, which plays a crucial role in subsequent tasks such as face recognition, gait recognition, and crowd counting.

Target detection refers to finding all objects of interest in an image, including two sub-tasks of object positioning and object classification, which can simultaneously determine a category and a position of an object. The main performance indicators of the target detection model are detection accuracy and speed, and the accuracy mainly considers the positioning and classification accuracy of the object.

In order to improve the detection speed, the traditional target detection model generally uses a lightweight network for detection. However, the lightweight network generally sets fewer model parameters to ensure the detection speed, and fewer model parameters means that the detection accuracy is reduced, which cannot solve the problem of avoiding introducing more model parameters while improving the detection accuracy.

SUMMARY

The present disclosure provides an optimization method and device for target detection, for avoiding introducing more model parameters while improving the accuracy of target detection, so as to ensure that the speed of target detection does not decrease.

In a first aspect, an optimization method for target detection according to an embodiment of the present disclosure includes:

inputting an image including an object into a trained target detection model for detection, and determining coordinates of the object in the image and a category of the object:

where the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set: where the optimal pruning scheme is obtained by screening pruning schemes determined according to different pruning methods and pruning rates.

The target detection model provided in this embodiment encodes more spatial information of the image through a plurality of depthwise convolutional network layers to improve the accuracy of the target detection model. At the same time, the model parameters in the target detection model are pruned through a plurality of pruning schemes to greatly reduce the model parameters of the target detection model and improve the speed of the target detection model.

As an optional embodiment, before the inputting the image including the object into the trained target detection model for detection, the method further includes:

decoding an obtained video stream including the object to obtain frames of images including the object in three-channel RGB format: or, performing format conversion on an obtained unprocessed image including the object to obtain an image including the object in RGB format.

As an optional embodiment, before the inputting the image including the object into the trained target detection model for detection, the method further includes:

under a condition of maintaining an original ratio of the image, normalizing a size of the image to obtain an image of a preset size.

As an optional embodiment, the inputting the image including the object into the trained target detection model for detection, and determining the coordinates of the object in the image and the category of the object, includes:

inputting the image including the object into the trained target detection model for detection, and obtaining coordinates of each candidate frame of the object in the image and a confidence degree of a category corresponding to each candidate frame:

screening out each preferred candidate frame with a confidence degree greater than a threshold from candidate frames;

determining the coordinates of the object in the image according to coordinates of each preferred candidate frame, and determining the category of the object according to a category corresponding to each preferred candidate frame.

As an optional embodiment, the determining the coordinates of the object in the image according to the coordinates of each preferred candidate frame, and determining the category of the object according to the category corresponding to each preferred candidate frame, includes:

screening out an optimal candidate frame from preferred candidate frames according to a Non-Maximum Suppression, NMS, method;

determining coordinates of the optimal candidate frame as the coordinates of the object in the image, and determining a category corresponding to the optimal candidate frame as the category of the object.

As an optional embodiment, when the image including the object is normalized in size and then input into the trained target detection model for detection, before the determining the coordinates of the optimal candidate frame as the coordinates of the object in the image, the method further includes:

converting the coordinates of the optimal candidate frame into a coordinate system of the image before normalization, and determining coordinates obtained after conversion as the coordinates of the optimal candidate frame.

As an optional embodiment, the target detection model includes a backbone network, a neck network, and a head network, where:

the backbone network is configured to extract features of the image, the backbone network includes a plurality of depthwise convolutional network layers and a plurality of unit convolutional network layers, where the depthwise convolutional network layers are symmetrically distributed at head and tail of the backbone network, the unit convolutional network layers are distributed in middle of the backbone network;

the neck network is configured to perform feature fusion on features extracted by the backbone network to obtain a fused feature map;

the head network is configured to detect an object in the fused feature map to obtain coordinates of the object in the image and a category of the object.

As an optional embodiment, a data volume of training samples in the second training sample set is smaller than a data volume of training samples in the first training sample set.

As an optional embodiment, the pruning method includes at least one of block pruning, structured pruning, or unstructured pruning.

As an optional embodiment, the pruning the model parameters in the to-be-optimized model using the optimal pruning scheme, includes:

pruning the model parameters corresponding to at least one network layer in the to-be-optimized model using the optimal pruning scheme.

As an optional embodiment, the optimal pruning scheme is determined by:

determining pruning schemes based on different pruning methods and pruning rates;

evaluating performance of each to-be-optimized model corresponding to each pruning scheme separately according to Bayesian optimization, and obtaining evaluation performance of each to-be-optimized model;

determining the optimal pruning scheme corresponding to optimal evaluation performance from obtained evaluation performance.

As an optional embodiment, the evaluating the performance of each to-be-optimized models corresponding to each pruning scheme separately according to Bayesian optimization, and obtaining the evaluation performance of each to-be-optimized model, includes:

initially evaluating the performance of the to-be-optimized models corresponding to each pruning scheme according to Bayesian optimization, and obtaining initial evaluation performance of each to-be-optimized model;

screening each pruning scheme according to a preset number of iterations, and a degree of influence of a gradient of mean values of a Gaussian process obeyed by each to-be-optimized model on performance, and reevaluating performance of each to-be-optimized model corresponding to each screened pruning scheme;

determining the evaluation performance of each to-be-optimized model according to the evaluation performance corresponding to each pruning scheme obtained after a last iteration is completed.

As an optional embodiment, the screening each pruning scheme according to the degree of influence of gradient of the mean values of the Gaussian process obeyed by each to-be-optimized model on performance, includes:

converting the gradient into a gradient probability;

screening pruning schemes by replacing the pruning scheme of the to-be-optimized model with the gradient probability greater than a first threshold with the pruning scheme of the to-be-optimized model with the gradient probability less than a second threshold, where the first threshold is greater than the second threshold.

As an optional embodiment, the method further includes:

determining a calculation amount of each network layer in the target detection model;

using a Graphics Processing Unit, GPU, to process data of the network layer with the calculation amount higher than a data threshold, and using a Central Processing Unit, CPU, to process data of the network layer with the calculation amount not higher than the data threshold.

As an optional embodiment, after the determining the coordinates of the object in the image and the category of the object, the method further includes:

screening out an image including the object with a largest size from images in which the category belongs to a preset category; or, screening out an image including the object with a highest definition from images in which the category belongs to a preset category and a size of the object is larger than a size threshold; or, screening out an image including the object with a highest definition from images in which the category belongs to a preset category; or, screening out an image including the object with a largest size from images in which the category belongs to a preset category and a definition of the object is greater than a definition threshold.

As an optional embodiment, the method further includes:

obtaining position information of each key point of the object in the screened image according to a preset key point;

aligning the object in the screened image according to the position information;

extracting features from the aligned image to obtain features of the object.

In a second aspect, an optimization device for target detection, including a processor and a memory, the memory is configured to store a program executable by the processor, and the processor is configured to read the program in the memory and perform steps of:

inputting an image including an object into a trained target detection model for detection, and determining coordinates of the object in the image and a category of the object;

where the target detection model includes a plurality of depthwise convolutional network layers, and the target detection model is obtained by; training using a first training sample set to obtain a to-be-optimized model, pruning model parameters in the to-be-optimized model using an optimal pruning scheme, and training the pruned to-be-optimized model using a second training sample set: where the optimal pruning scheme is obtained by screening pruning schemes determined according to different pruning methods and pruning rates.

As an optional embodiment, before the inputting the image including the object into the trained target detection model for detection, the processor is further configured to:

decode an obtained video stream including the object to obtain frames of images including the object in three-channel RGB format; or, perform format conversion on an obtained unprocessed image including the object to obtain an image including the object in RGB format.

As an optional embodiment, before the inputting the image including the object into the trained target detection model for detection, the processor is further configured to: under a condition of maintaining an original ratio of the image, normalize a size of the image to obtain an image of a preset size.

As an optional embodiment, the processor is further configured to:

input the image including the object into the trained target detection model for detection, and obtain coordinates of each candidate frame of the object in the image and a confidence degree of a category corresponding to each candidate frame;

screen out each preferred candidate frame with a confidence degree greater than a threshold from candidate frames;

determine the coordinates of the object in the image according to coordinates of each preferred candidate frame, and determine the category of the object according to a category corresponding to each preferred candidate frame.

As an optional embodiment, the processor is further configured to:

screen out an optimal candidate frame from preferred candidate frames according to a Non-Maximum Suppression, NMS, method;

determine coordinates of the optimal candidate frame as the coordinates of the object in the image, and determine a category corresponding to the optimal candidate frame as the category of the object.

As an optional embodiment, when the image including the object is normalized in size and then input into the trained target detection model for detection, before the determining the coordinates of the optimal candidate frame as the coordinates of the object in the image, the processor is further configured to:

convert the coordinates of the optimal candidate frame into a coordinate system of the image before normalization, and determine coordinates obtained after conversion as the coordinates of the optimal candidate frame.

As an optional embodiment, the target detection model includes a backbone network, a neck network, and a head network, where:

the backbone network is configured to extract features of the image, the backbone network includes a plurality of depthwise convolutional network layers and a plurality of unit convolutional network layers, where the depthwise convolutional network layers are symmetrically distributed at head and tail of the backbone network's head and tail, the unit convolutional network layers are distributed in middle of the backbone network;

the neck network is configured to perform feature fusion on features extracted by the backbone network to obtain a fused feature map;

the head network is configured to detect an object in the fused feature map to obtain coordinates of the object in the image and a category of the object.

As an optional embodiment, a data volume of training samples in the second training sample set is smaller than a data volume of training samples in the first training sample set.

As an optional embodiment, the pruning method includes at least one of block pruning, structured pruning, or unstructured pruning.

As an optional embodiment, the processor is further configured to:

prune model parameters corresponding to at least one network layer in the to-be-optimized model using the optimal pruning scheme.

As an optional embodiment, the processor is further configured to determine the optimal pruning scheme by:

determining pruning schemes based on different pruning methods and pruning rates;

evaluating performance of each to-be-optimized model corresponding to each pruning scheme separately according to Bayesian optimization, and obtaining evaluation performance of each to-be-optimized model;

determining the optimal pruning scheme corresponding to optimal evaluation performance from obtained evaluation performance.

As an optional embodiment, the processor is further configured to:

initially evaluate the performance of each to-be-optimized models corresponding to each pruning scheme according to Bayesian optimization, and obtain initial evaluation performance of each to-be-optimized model;

screen each pruning scheme according to a preset number of iterations, and a degree of influence of a gradient of mean values of a Gaussian process obeyed by the to-be-optimized model on performance, and reevaluate performance of each to-be-optimized model corresponding to each screened pruning scheme;

determine the evaluation performance of each to-be-optimized model according to the evaluation performance corresponding to each pruning scheme obtained after a last iteration is completed.

As an optional embodiment, the processor is further configured to:

convert the gradient into a gradient probability;

screen pruning schemes by replacing the pruning scheme of the to-be-optimized model with the gradient probability greater than a first threshold with the pruning scheme of the to-be-optimized model with the gradient probability less than a second threshold, where the first threshold is greater than the second threshold.

As an optional embodiment, the processor is further configured to:

determine a calculation amount of each network layer in the target detection model;

use a Graphics Processing Unit, GPU, to process data of the network layer with the calculation amount higher than a data threshold, and use a Central Processing Unit, CPU, to process data of the network layer with the calculation amount not higher than the data threshold.

As an optional embodiment, after the determining the coordinates of the object in the image and the category of the object, the processor is further configured to:

screen out an image including the object with a largest size from images in which the category belongs to a preset category; or, screen out an image including the object with a highest definition from images in which the category belongs to a preset category and a size of the object is larger than a size threshold; or, screen out an image including the object with a highest definition from images in which the category belongs to a preset category; or, screen out an image including the object with a largest size from images in which the category belongs to a preset category and a definition of the object is greater than a definition threshold.

As an optional embodiment, the processor is further configured to:

obtain position information of each key point of the object in screened image according to a preset key point;

align the object in the screened image according to the position information;

extract features from the aligned image to obtain features of the object.

In a third aspect, an optimization apparatus for target detection according to some embodiments of the present disclosure includes:

a detection unit, configured to input an image including an object into a trained target detection model for detection, and determine coordinates of the object in the image and a category of the object;

where the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set; where the optimal pruning scheme is obtained by screening pruning schemes determined according to different pruning methods and pruning rates.

In a fourth aspect, some embodiments of the present disclosure further provide a computer storage medium storing a computer program thereon, where the computer program, when being executed by a processor, implements steps of the method according to the first aspect.

These or other aspects of the present disclosure will be more concise and understandable in the description of following embodiments.

BRIEF DESCRIPTION OF FIGURES

In order to more clearly illustrate technical solutions in embodiments of the present disclosure, drawings that need to be used in description of embodiments will be briefly introduced below. Obviously, the drawings in the following description are only some embodiments of the present disclosure. Those of ordinary skill in the art can also obtain other drawings based on these drawings without any creative effort.

FIG. 1 is a schematic structural diagram of a lightweight network in related art.

FIG. 2 is an implementation flowchart of an optimized target detection method according to an embodiment of the present disclosure.

DETAILED DESCRIPTION

Figure 3:
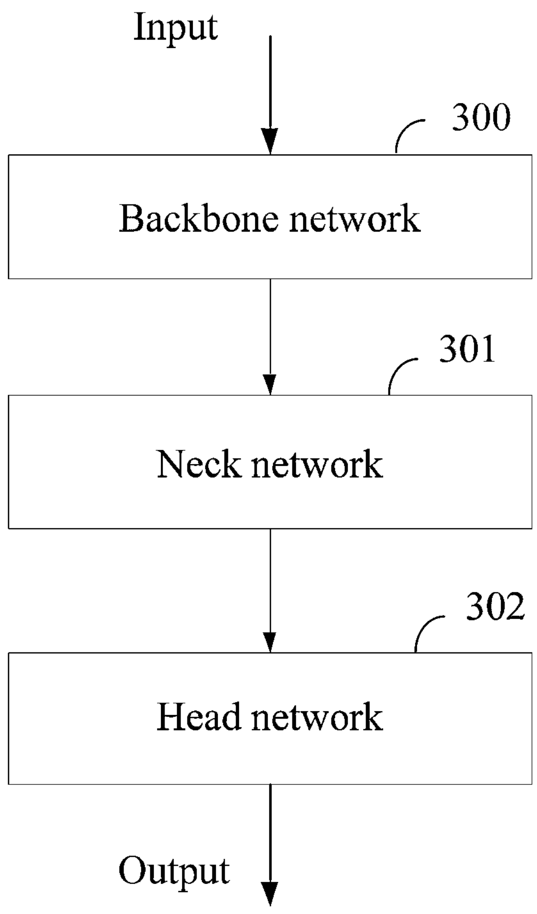
FIG. 3 is a schematic structural diagram of a target detection model according to an embodiment of the present disclosure.

In order to make objects, technical solutions and advantages of the present disclosure more clear, the present disclosure will be described in further detail below with reference to accompanying drawing. Obviously, the described embodiments are only a portion of embodiments of the present disclosure, but are not all embodiments. Based on embodiments in the present disclosure, all other embodiment obtained by the skilled in the art without creative effort fall within the scope of the present disclosure.

In embodiments of the present disclosure, the term "and/or" describes an association relationship between associated objects, indicating that there may be three relationships, for example, A and/or B can represent three cases: A exists alone, A and B exist simultaneously, and B exists alone. The character "/" generally indicates that an association relationship between the associated objects is an "or" relationship.

Application scenarios described in embodiments of the present disclosure are intended to more clearly illustrate technical solutions of embodiments of the present disclosure, but do not constitute a limitation to technical solutions according to embodiments of the present disclosure. The skilled in the art will know that, with the emergence of new application scenarios, the technical solutions according to embodiments of the present disclosure are also applicable to similar technical problems. In the description of the present disclosure, "plurality" means two or more unless otherwise specified.

The target detection is an important branch of image processing and computer vision, and is also the core part of the intelligent monitoring system. At the same time, the target detection is also a basic algorithm in the field of identification, which plays a crucial role in subsequent tasks such as face recognition, gait recognition, and crowd counting. The target detection refers to finding all objects of interest in an image, including two sub-tasks of object positioning and object classification, which can simultaneously determine the category and position of the object. The main performance indicators of the target detection model are detection accuracy and speed, and the accuracy mainly considers the positioning and classification accuracy of the object. In order to improve the detection speed, the traditional target detection model generally uses a lightweight network for detection. As shown in FIG. 1, a network structure of a lightweight network MobieNetV2, from input to output includes a unit convolutional network layer (Conv 1×1), a depthwise convolutional network layer (DW Conv 3×3), and a unit convolutional network layer (Conv 1×1). Here, it is easy to understand that the smaller the convolution kernel, the less feature information the network layer can extract, and the fewer model parameters in the network, the faster the calculation speed. Therefore, the unit convolutional network layer can improve the detection speed, and the depthwise convolutional network layer can extract more feature information and have more model parameters, which can ensure the accuracy of detection. However, the current lightweight network generally sets fewer model parameters in order to improve the detection speed under the condition of ensuring a certain detection accuracy, which cannot solve a problem of ensuring the detection speed not to decrease in a case that the depthwise convolutional network layer is introduced to improve the accuracy of detection.

In an embodiment, in order to solve the problem that the current detection speed and detection accuracy are difficult to be guaranteed at the same time, the core idea of this embodiment is to increase a depthwise convolutional network layer on the one hand to improve the accuracy of target detection, and on the other hand, use pruning schemes to prune model parameters in the target detection model, reducing the total amount of model parameters and improving the speed of target detection. In this embodiment, starting from the structure and model parameter optimization of the target detection model, by increasing the depthwise convolutional network layer and pruning the model parameters in the target detection model, the detection speed of the target detection model can be improved while ensuring high accuracy.

As shown in FIG. 2, an optimized target detection method according to an embodiment is shown, and an implementation flow of the method is as follows.

Step 200, inputting an image including an object into a trained target detection model for detection, and determining coordinates of the object in the image and a category of the object.

The target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set: where the optimal pruning scheme is obtained by screening pruning schemes determined according to different pruning methods and pruning rates.

In this embodiment, the object includes but is not limited to human face, human body, body parts, vehicles, physical objects, etc., which are determined according to actual requirements, and are not limited in this embodiment.

In implementation, after the image is input to the target detection model, the coordinates and the category of the object in the output image are output in the form of a candidate frame, that is, the object is framed by the candidate frame in the image, and the coordinates of the candidate frame (i.e., the coordinates of the object) and the category corresponding to the candidate frame are marked. The category can be determined according to actual requirements, for example, if the target detection model is used to detect a human face, then the category includes two categories of human face and non-human, or if the target detection model is used to detect gender, the category includes two categories of male and female, which are not too limited in this embodiment.

Since the target detection model in this embodiment includes a plurality of depthwise convolutional network layers, in some embodiments, depthwise separable convolution can be used to better encode more spatial information, and the depthwise separable convolution is divided into two parts. First, a given convolution kernel size is used to convolve each channel (such as each channel in RGB channels) separately and convolution results are combined, and this part is called the depthwise convolution. Then the depthwise separable convolution uses a unit convolution kernel to perform standard convolution and outputs a feature map, and this part is called pointwise convolution. Since the depthwise convolution or the depthwise separable convolution can encode more spatial information, and at the same time require less computation than conventional convolution, it is possible to improve detection accuracy with only a small increase in the model parameters of the target detection model, and the optimal pruning scheme obtained through the screening of pruning schemes prunes the model parameters of the target detection model to remove the model parameters that do not affect the detection accuracy, reducing the model parameters and improving the speed of target detection.

In some examples, as shown in FIG. 3, a structure of the target detection model in this embodiment includes following networks.

A backbone network 300 is configured to extract features of the image: if a to-be-detected object is a human face, the backbone network is configured to extract semantic feature information related to the human face in the image.

In some examples, the backbone network includes a plurality of depthwise convolutional network layers and a plurality of unit convolutional network layers, and the structure of the backbone network includes any of the following.

Figure 4A:
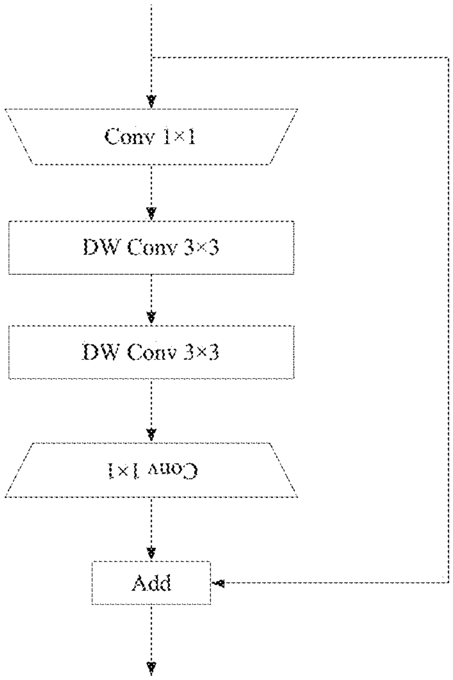
FIG. 4A is a schematic structural diagram of a first backbone network according to an embodiment of the present disclosure.

A first structure, as shown in FIG. 4A, includes two depthwise convolutional network layers (DW Conv 3×3), and two unit convolutional network layers (Conv 1×1). Moreover, two depthwise convolutional network layers (DW Conv 3×3) are placed in the middle of the model, and two unit convolutional network layers are placed at the head and tail of the model respectively. Here, the depthwise convolution (DW Conv) can encode more spatial information than 1×1 convolution (Conv1×1), and the depthwise convolution is also a lightweight unit. Adding depthwise convolution between 1×1 convolutions can improve the accuracy of face detection under the premise of only adding few model parameter.

Figure 4B:
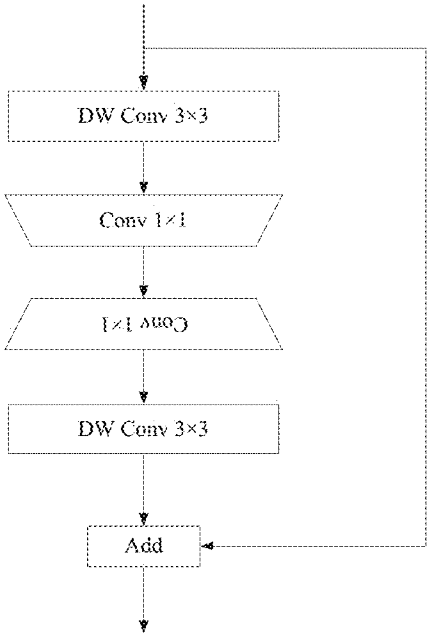
FIG. 4B is a schematic structural diagram of a second backbone network according to an embodiment of the present disclosure.

A second structure, as shown in FIG. 4B, includes two depthwise convolutional network layers (DW Conv 3×3), and two unit convolutional network layers (Conv 1×1). The depthwise convolutional network layers are distributed symmetrically at the head and tail of the backbone network, and the unit convolutional network layers are distributed in the middle of the backbone network. Here, adjusting the two depthwise convolutions before and after the 1×1 convolution can further improve the ability to encode spatial information compared with the first structure, further improving the accuracy of face detection, and the increased model parameters are also very few.

In this embodiment, the structure of the backbone network of the target detection network is redesigned, and the inference speed of the target detection is improved by greatly reducing the amount of model parameters through the pruning schemes on the premise of ensuring that the accuracy does not decrease. Compared with MobileNetV2, the inference speed of the target detection has been greatly improved under the premise of no decrease in accuracy. Here, after a large number of experiments, it has been proved that the detection performance comprehensively obtained under the detection speed and detection accuracy of the second structure in this embodiment is optimal.

Figure 4C:
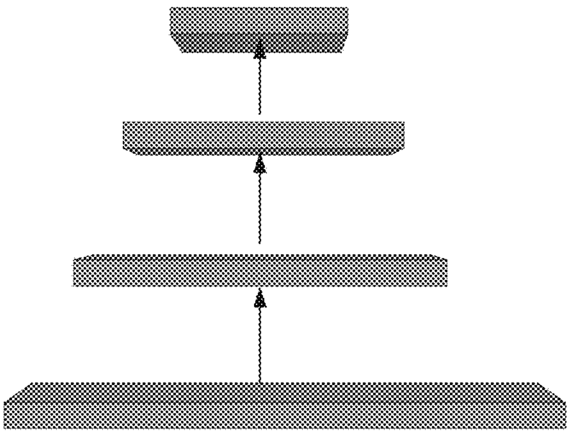
FIG. 4C is a schematic structural diagram of a third backbone network according to an embodiment of the present disclosure.

As shown in FIG. 4C, the backbone network adopts a feature extraction architecture of bottom-to-up and layer-by-layer refining. Features that can be extracted by the upper network layer are less than features that can be extracted by the lower network layer, but are more refined.

A neck network 301 is configured to perform feature fusion on features extracted by the backbone network to obtain a fused feature map.

It should be noted that semantic information of features extracted by different network layers of the backbone network is different, and different semantic information can be fused through the neck network to obtain a feature map including both high-level semantic information and low-level semantic information of the object.

In implementation, the neck network can adopt the structure of upsampling+splicing and fusion, including but not limited to Feature Pyramid Networks (FPN), Perceptual Adversarial Network (PAN), dedicated network, custom network, etc.

A head network 302 is configured to detect an object in the fused feature map to obtain coordinates of the object in the image and a category of the object.

In implementation, the function of the head network is to further extract coordinates and a confidence degree of a candidate frame of the object from the feature map output by the neck network. The confidence degree is used to characterize the degree of belonging to a certain category.

Figure 5:
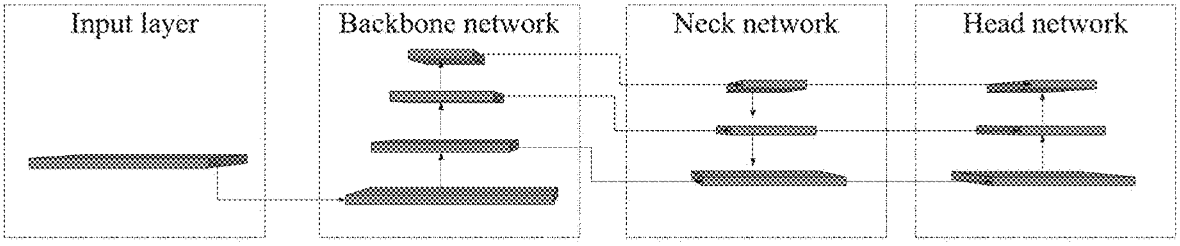
FIG. 5 is a schematic diagram of a connection relationship between networks in a target detection model according to an embodiment of the present disclosure.

As shown in FIG. 5, a connection relationship between networks in the target detection model according to this embodiment is shown, the image including the object is input to the backbone network (backbone) through an input layer (Input) for feature extraction, and after the neck network (Neck) fuses the features extracted by layers of the backbone network, the head network (Head) detects the object in the fused feature map, so as to determine the coordinates of the candidate frame of the object and the category of the object, for example, determining the coordinates of the face in the image and the confidence that the object is a human face.

In some embodiments, in order to improve the detection accuracy, before the image including the object is input to the trained target detection model for detection, the image may also be processed in advance. This embodiment provides the following multiple processing schemes, where various processing schemes may be implemented individually or in combination, and this embodiment does not make too many limitations on this.

The first processing scheme is format conversion processing, which includes any of the following types.

Type 1: decoding an obtained video stream including the object to obtain frames of images including the object in three-channel RGB format.

During implementation, if the video stream is obtained, the video stream may be decoded and uniformly converted into a three-channel RGB image.

Images in non-three-channel RGB format include, but are not limited to, images in grayscale and YUV formats. Here, "Y" represents the brightness, that is, the grayscale value, and "U" and "V" represent the chroma, which are used to describe the color and saturation of the image.

Type 2: performing format conversion on an obtained unprocessed image including the object to obtain an image including the object in RGB format.

If the obtained unprocessed image format is an image in non-RGB format, the unprocessed image is converted to an image in RGB format.

The second processing scheme is size normalization processing, which includes following step:

under a condition of remaining an original ratio of the image, normalizing a size of the image to obtain an image of a preset size.

During implementation, the image can be normalized to a preset size such as 640×384 dpi in width and height. In order to ensure the original ratio of the image, padding processing can also be performed during normalization processing.

In some embodiments, after the obtained image is processed by one or more of the above processing schemes, the processed image is input into the trained target detection model for detection, where the detection steps are as follows.

Step 1-1: inputting the image including the object into the trained target detection model for detection, and obtaining coordinates of each candidate frame of the object in the image and a confidence degree of a category corresponding to each candidate frame.

The coordinates of the candidate frame are used to represent a position of the detected object, and the confidence degree of the candidate frame is used to represent the degree of confidence that the detected object belongs to a certain category.

Step 1-2: screening out each preferred candidate frame with a confidence degree greater than a threshold from candidate frames.

It should be noted that candidate frames with a confidence degree smaller than a threshold Thr are screened out first. The smaller the Thr is, the stronger the ability of the target detection model to detect objects is, but it may lead to a small amount of false detection. The setting of the threshold can be adjusted according to actual application requirements, which is not limited too much in this embodiment.

Step 1-3: Determining the coordinates of the object in the image according to coordinates of each preferred candidate frame, and determining the category of the object according to the category corresponding to each preferred candidate frame.

In implementation, in order to screen out redundant candidate frames of the same object, the optimal one is determined from preferred candidate frames, and remaining preferred candidate frames are screened out, through following steps.

Step 2-1: screening out an optimal candidate frame from preferred candidate frames according to a Non-Maximum Suppression (NMS) method.

NMS is used to suppress the preferred candidate frame that is not with a maximum value, and extract the preferred candidate frame with the highest confidence degree, which can be understood as a local maximum search.

Step 2-2: Determining coordinates of the optimal candidate frame as the coordinates of the object in the image, and determining a category corresponding to the optimal candidate frame as the category of the object.

In some embodiments, the image is processed in the above manner, and input into the target detection model for detection to obtain the coordinates and category of the optimal candidate frame of the object. In implementation, taking human face detection as an example, the optimal candidate frame can be displayed in an image including a human face, where the optimal candidate frame frames the human face, and marks the coordinates of the human face in the image and the confidence degree of the category of the face. Since the size of the image including the object is normalized and input to the trained target detection model for detection, the coordinates of the optimal candidate frame output by the target detection model are based on the coordinates on the normalized image, so the coordinates need to be converted into a coordinate system of the original image before normalization, so as to finally determine the position of the object in the original image. The specific processing scheme is as follows.

If the image including the object is normalized in size and then input into the trained target detection model for detection, before the coordinates of the optimal candidate frame are determined as the coordinates of the object in the image, the coordinates of the optimal candidate frame are converted into the coordinate system of the image before normalization, and the coordinates obtained after conversion are determined as the coordinates of the optimal candidate frame.

In some embodiments, the target detection model in this embodiment needs to be obtained through at least two trainings, where the first training process is to use the first training sample set to train the target detection model, and obtain the trained to-be-optimized model. The specific training process is to use the training image in the first training sample set as input, and the coordinates and category of the object corresponding to the training image as output, to train the model parameters in the target detection model until it is calculated according to the model parameters that the loss value of the loss function is less than a set value, and it is determined that the training is completed at this time. Here, the loss function may be selected according to actual requirements, for example, the loss function may be an ArcFace function, which is not limited too much in this embodiment.

The second training process is to use the second training sample set to train the pruned to-be-optimized model to obtain a trained target detection model. The specific training process is to use the training image in the second training sample set as input, and the coordinates and category of the object corresponding to the training image as output, to train the model parameters in the target detection model until the loss value of the loss function calculated according to the model parameters is less than the set value, and it is determined that the training is completed at this time.

It should be noted that the difference between the first training process and the second training process lies in the number of training samples included in the training sample set. In this embodiment, a data volume of training samples in the second training sample set is smaller than a data volume of training samples in the first training sample set. During implementation, since the training data of the first training sample set needed to be used in the first training process is very large, in order to speed up the pruning process, some training samples can be selected from the first training sample set to form the second training sample set, thus speeding up the pruning process. Moreover, because the second training process is for the to-be-optimized model that has been trained, it only needs to use fewer training samples to achieve the purpose of training, which can effectively save training time and calculation amount.

It should be noted that the deeper the neural network layer is, and the more model parameters of the neural network model are, the more refined the calculation results will be, but at the same time, the more computing resources will be consumed. The pruning techniques are necessary to prune the model parameters, and those model parameters that do not contribute much to the output results are cut off. The current target detection scheme is difficult to achieve high-precision and fast detection, but based on the fact that the pruning scheme can achieve a balance between execution efficiency and accuracy, this embodiment uses the pruning scheme to prune the model parameters, so as to ensure detection accuracy and detection efficiency. The pruning method involved in this embodiment combines unstructured pruning, structured pruning and block pruning, and selects the optimal combination for the current model according to characteristics of different pruning methods.

In some embodiments, this embodiment uses various pruning schemes to prune the model parameters in the trained to-be-optimized model, where pruning schemes are determined according to different pruning methods and pruning rates, and then the optimal pruning scheme for pruning is screened out from determined pruning schemes. Different pruning methods and different pruning rates may be combined to obtain various pruning schemes.

In some embodiments, the pruning method in this embodiment includes but is not limited to at least one of block pruning, structured pruning, or unstructured pruning.

1) Block Pruning is as Follows.

The block pruning enables high hardware parallelism while maintaining high accuracy. In addition to the 3×3 CONV layer, it can also be mapped to other types of Deep Neural Networks, DNN, such as 1×1 CONV layer and fully connected, FC, layers, especially for efficient DNN inference on mobile devices with limited resources. The block pruning is to divide a weight matrix corresponding to a network layer (DNN layer) in the target detection model into a plurality of blocks of equal size, and each block includes weights of parameter kernels of a plurality of channels from a plurality of filters. In each block, a set of weights are pruned at same positions of all filters, and at the same time, weights are pruned at same positions of all channels. The pruned weights pass through the same positions of all filters and channels within a block. Here, the number of pruned weights in each block is flexible and can vary from block to block. The parameter kernels in each block undergo the same pruning process, i.e. pruning one or more weights at the same position.

From the perspective of accuracy, the block pruning adopts a fine-grained structured pruning strategy to increase structural flexibility and reduce loss of accuracy. From a hardware performance perspective, compared to coarse-grained structured pruning, the block pruning scheme is able to achieve high hardware parallelism by using appropriate block sizes and the help of compiler-level code generation. Block pruning can make better use of hardware parallelism from both memory and computation perspectives. First, in convolution computation, all filters share the same input at each layer. Since the same positions of all filters in each block are removed, these filters may skip reading the same input data, relieving memory pressure between threads processing these filters. Second, restricting deletion of channels at the same positions within a block guarantees that all these channels share the same computation mode (index), eliminating computation divergence between threads of channels within each block. In the block pruning scheme, the block size affects the accuracy and hardware acceleration. On one hand, a smaller block size provides higher structural flexibility due to its finer granularity, often resulting in higher accuracy at the cost of reduced speed. On the other hand, a larger block size can make better use of hardware parallelism to achieve higher acceleration, but may also cause more serious loss of accuracy. Therefore, the block size can be determined according to actual requirements. To determine an appropriate block size, the number of channels included in each block is first determined by taking into account the computing resources of the device. For example, for each block, the same number of channels as the vector register length in a CPU/GPU of a terminal is used to achieve high parallelism. If the number of channels included in each block is less than the vector register length, both the vector register and the vector computing unit will be underutilized. On the contrary, increasing the number of channels does not improve the performance, but leads to a more serious loss of accuracy. Therefore, considering the trade-off between accuracy and hardware acceleration, the number of filters included in each block should be determined accordingly. The hardware acceleration can be derived from the inference speed, and the hardware acceleration can be obtained without retraining the DNN model (target detection model), which is easier to derive than the model accuracy. Therefore, a reasonable minimum inference speed requirement is set as a design goal that needs to be met. In cases where the block size meets the inference speed goal, the minimum number of filters in each block is chosen to be kept to reduce the loss of accuracy. The block pruning can achieve a better balance between improving inference speed and maintaining accuracy.

Figure 6:
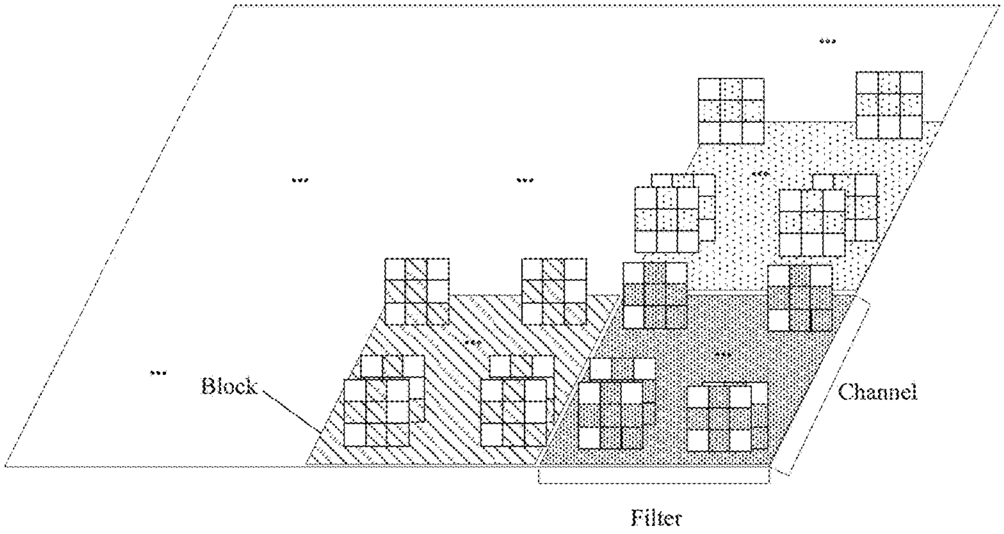
FIG. 6 is a schematic diagram of block pruning according to an embodiment of the present disclosure.

As shown in FIG. 6, each block includes m×n kernels from m filters and n channels, the pruning process in the same block is the same, and the pruning process between different blocks is different. White squares represent weights of the pruned parameter kernels.

2) Structured Pruning is as Follows.

Figure 7A:
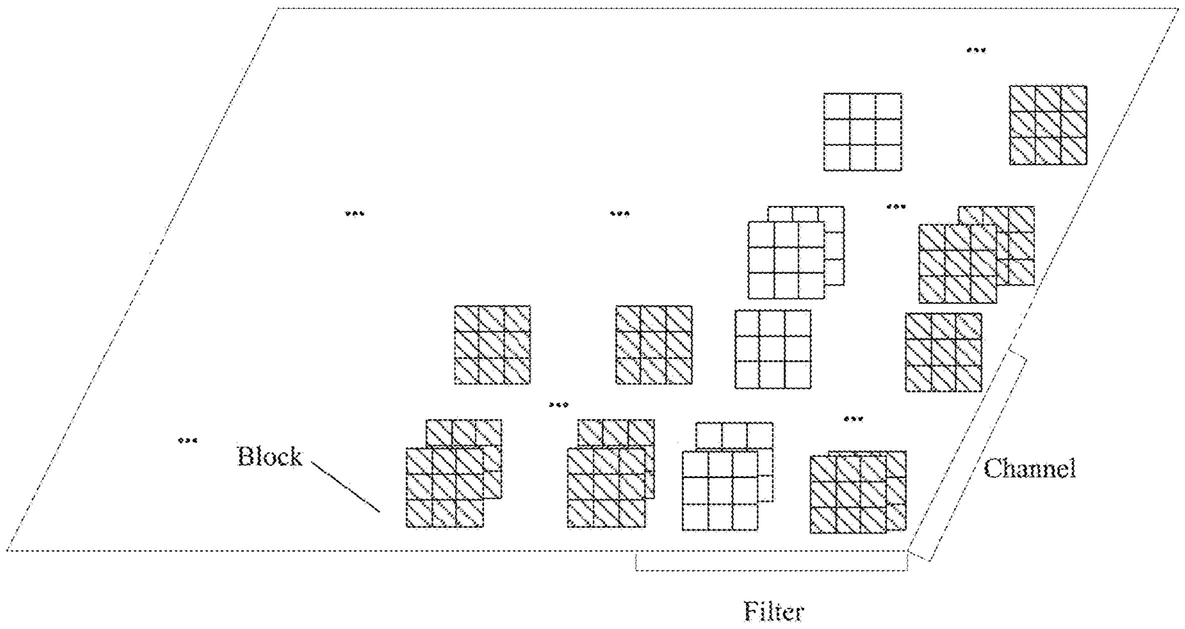
FIG. 7A is a schematic diagram of first structured pruning according to an embodiment of the present disclosure.
Figure 7B:
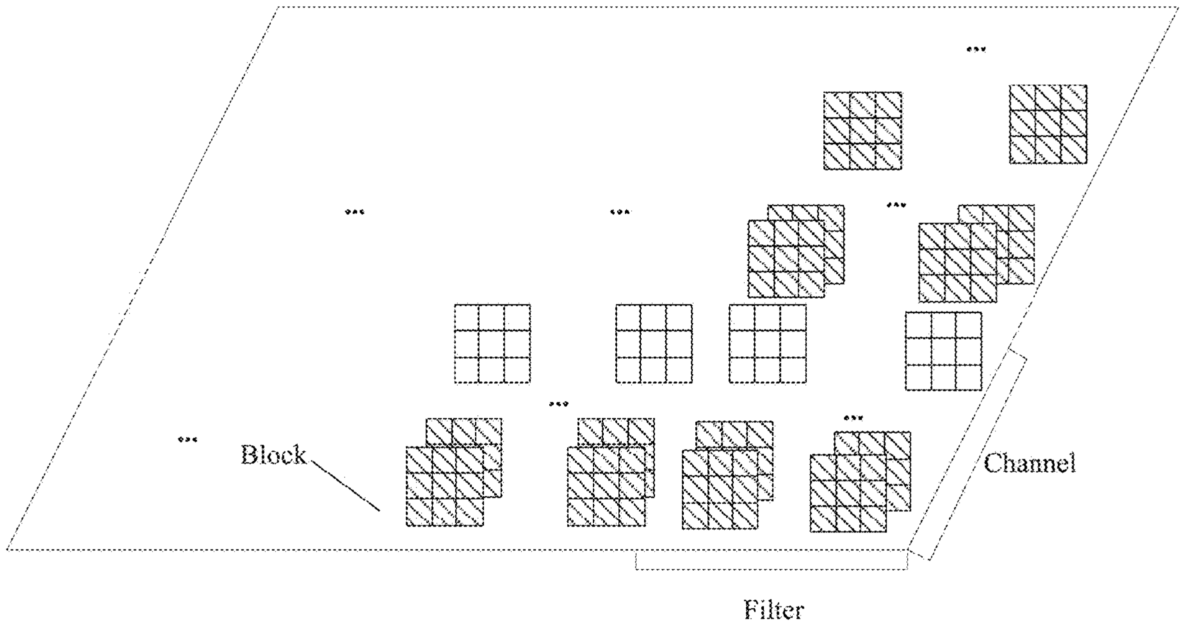
FIG. 7B is a schematic diagram of second structured pruning according to an embodiment of the present disclosure.

The structured pruning is to prune the entire channel/filter of the weight matrix. For example, according to a certain structural rule, the weights of all parameter kernels of a certain dimension are pruned. As shown in FIG. 7A, the weights of all parameter kernels on a certain filter dimension are all pruned. As shown in FIG. 7B, the weights of all parameter kernels on a certain channel dimension are all pruned. The white squares represent the weights of the pruned parameter kernels. The filter pruning removes entire rows of the weight matrix, and the channel pruning removes consecutive columns of the corresponding channel in the weight matrix. The structured pruning preserves the regular shape of the weight matrix for dimensionality reduction. Therefore, it is hardware friendly and can be accelerated by taking advantage of hardware parallelism. However, its accuracy suffers greatly due to the coarse-grained feature of structured pruning. Pattern-based structured pruning is considered as a fine-grained structured pruning scheme. Due to its appropriate structural flexibility and structural regularity, both the accuracy and hardware performance are maintained. Mode-based structured pruning includes two parts: kernel-mode pruning and connectivity pruning. The kernel-mode pruning is used to prune (remove) a fixed number of weights in each convolution kernel.

In most cases, the structured pruning can achieve higher acceleration but the accuracy may drop significantly. However, when the structure of the model parameters can match the structured pruning, it is possible to obtain both higher acceleration and less accuracy drop.

3) Unstructured Pruning is as Follows.

Figure 8:
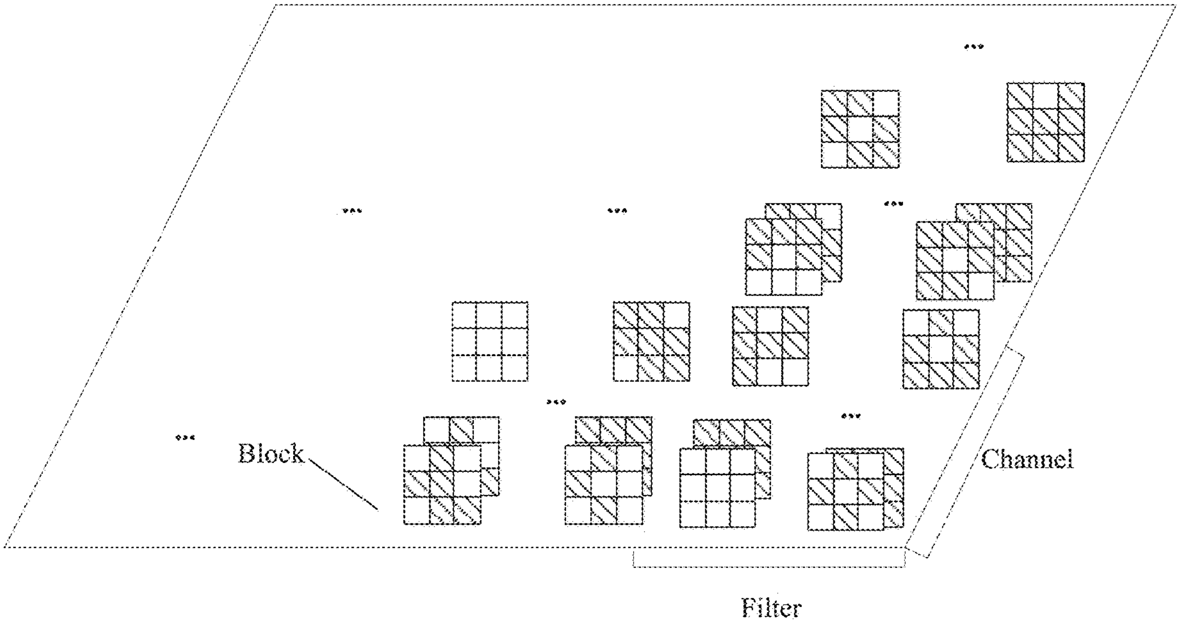
FIG. 8 is a schematic diagram of unstructured pruning according to an embodiment of the present disclosure.

The unstructured pruning allows weights to be pruned anywhere in the weight matrix, guaranteeing higher flexibility for search-optimized pruning structures, often with high compression rates and little loss of accuracy. However, the unstructured pruning results in irregular sparsity of the weight matrix, requiring additional indices to locate non-zero weights during computation. This leaves the hardware parallelism provided by the underlying system (e.g., a GPU on a mobile platform) underutilized. Therefore, the unstructured pruning alone is not suitable for DNN inference acceleration. As shown in FIG. 8, the unstructured pruning is used to prune a weight of a parameter kernel of a certain channel on a certain filter dimension. The white squares represent weights of pruned parameter kernels. Compared with the block pruning and the structured pruning, the unstructured pruning is more cumbersome and computationally intensive. In most cases, the unstructured pruning can make the accuracy drop smaller but the acceleration is also lower. However, when the structure of the model parameters can match the unstructured method, it can make the accuracy drop smaller and get a higher speed.

In some embodiments, the same pruning method may have different acceleration and accuracy results obtained by using different pruning rates. In this embodiment, various pruning schemes can be determined based on different pruning methods and pruning rates. Optionally, the pruning rates include 1×, 2×, 2.5×, 3×, 5×, 7×, 10×, skip, where x represents a multiple, and the larger the pruning rate, the less model parameters are retained, 1× means no pruning, and skip means pruning the entire network layer directly.

In some embodiments, the optimal pruning scheme selected from various pruning schemes is used to prune model parameters corresponding to at least one network layer in the to-be-optimized model, reducing the number of model parameters and improving the detection speed. In some embodiments, the optimal pruning scheme selected from pruning schemes is used to prune the model parameters corresponding to all network layers in the to-be-optimized model, that is to say, each pruning scheme determined in this embodiment includes a pruning method and a pruning rate corresponding to each layer in the target detection model.

The target detection model or the to-be-optimized model in this embodiment is a CNN structure. In the CNN structure, after passing through multiple convolutional layers and pooling layers, one or more fully connected layers are connected. Each neuron in a fully connected layer is fully connected to all neurons in a previous layer. The fully connected layers can integrate class-discriminative local information in convolutional layers or pooling layers. In order to improve the performance of the CNN network, an activation function of each neuron in the fully connected layer generally adopts a ReLU function. Output values of the last fully connected layer are passed to an output that can be classified using softmax logistic regression (softmax regression), this layer can also be called a softmax layer. Generally, the training algorithm of the fully connected layer of CNN adopts the Back Propagation (BP) algorithm. When calculating how many layers a neural network has, generally only the layers with weights and parameters are computed, because the pooling layer has no weight and parameter, only has some hyperparameters. The pruning scheme in this embodiment can also perform pruning processing on the hyperparameters in the pooling layer.

In some embodiments, in a search space composed of randomly generated pruning schemes, the performance of the to-be-optimized model corresponding to each pruning scheme is evaluated according to Bayesian optimization, and the optimal pruning scheme is selected from pruning schemes according to evaluation results. In some embodiments, the process of selecting the optimal pruning scheme from pruning schemes according to the evaluation results is performed iteratively using the Gaussian process. After using a pruning scheme to prune the model parameters in the to-be-optimized model, a second training sample set is used to train the pruned to-be-optimized model. Assuming that any trained to-be-optimized model obeys a Gaussian process (Gaussian distribution), a gradient of mean values of the Gaussian process of the trained to-be-optimized model is used to update the pruning scheme, the updated pruning scheme is used to continue pruning the model parameters in the to-be-optimized model, the second training sample set is used to train the pruned to-be-optimized model, and the gradient of the mean values of the Gaussian process of the trained to-be-optimized model is used to continue updating the pruning scheme until the number of iterations is satisfied. After the pruning scheme obtained after the last iteration is used to prune the model parameters in the to-be-optimized model, the second training sample set is used to train the pruned to-be-optimized model, and the optimal pruning scheme is screened out from pruning schemes according to evaluation results.

During implementation, this embodiment determines the optimal pruning scheme of the target detection model through following steps.

Step 3-1, determining pruning schemes based on different pruning methods and pruning rates.

During implementation, pruning schemes are randomly generated according to pair-wise combination of different pruning methods and pruning rates. The number of pruning schemes generated at this time is very large, and can exceed 10,000.

Step 3-2: evaluating performance of each to-be-optimized model corresponding to each pruning scheme separately according to Bayesian Optimization (BO), and obtaining evaluation performance of each to-be-optimized model.

In implementation, it is necessary to determine the to-be-optimized model corresponding to each pruning scheme. The specific process is to use various pruning schemes to prune the target detection model separately, obtain each initial to-be-optimized model corresponding to each pruning scheme, and use the second training sample set to separately train each initial to-be-optimized model to obtain each to-be-optimized model.

The main purpose of Bayesian optimization is to learn the expression form of the target detection model and find the maximum (or minimum) value of a function within a certain range. In this embodiment, the Bayesian optimization is used to evaluate the performance corresponding to each pruning scheme, and obtain the maximum value of an evaluation function. The evaluation function used is shown in formula (1), and the function value P is used to represent the performance of the to-be-optimized model corresponding to the pruning scheme, where the performance includes the inference speed and accuracy of the target detection model. The purpose of the pruning scheme is to remove unimportant model parameters in the model.

$$P = A - \alpha * \text{MAX}(0, t - T); \quad \text{formula (1)}$$

here, A represents the detection accuracy of the target detection model, (with a value range of 0-1.0); t represents delay time of inference of the target detection model, (in milliseconds); T represents a delay time threshold, (in milliseconds); a is a weight coefficient (which can be set according to requirements, the range is 0.001~0.1). P represents the combination of detection speed and detection accuracy, that is to say, when the target detection model meets the speed requirements and the accuracy is high, P is larger, and vice versa.

Step 3-3: Determining the optimal pruning scheme corresponding to optimal evaluation performance from obtained evaluation performance.

In some embodiments, the process of evaluating the performance of each to-be-optimized model corresponding to each pruning scheme separately according to Bayesian optimization, and obtaining the evaluation performance of each to-be-optimized model is a process of iteratively updating the pruning scheme and evaluation performance of the corresponding to-be-optimized model. The specific implementation process is as follows.

1) According to Bayesian optimization, the performance of each to-be-optimized models corresponding to each pruning scheme is initially evaluated, and initial evaluation performance of each to-be-optimized model is obtained.

In some embodiments, to-be-optimized models corresponding to respective pruning schemes generated based on different pruning methods and pruning rates are obtained by using the pruning schemes to prune the model parameters in the to-be-optimized models respectively, and then using the second training sample set to train pruned initial to-be-optimized models, so that the performance of each trained to-be-optimized model is initially evaluated according to Bayesian optimization, and the initial evaluation performance of each to-be-optimized model is obtained.

2) According to a preset number of iterations, and a degree of influence of a gradient of mean values of a Gaussian process obeyed by each to-be-optimized model on performance, each pruning scheme is screened, and performance of each to-be-optimized model corresponding to each screened pruning scheme is reevaluated.

In some embodiments, after the initial evaluation performance is obtained, the Gaussian process (Gaussian distribution) obeyed by each trained to-be-optimized model is used to solve the gradient of the mean values of the Gaussian process of each to-be-optimized model, where the gradient is greater than zero, indicating that the pruning scheme corresponding to the gradient is beneficial to improve performance, and the gradient is less than zero, indicating that the pruning scheme corresponding to the gradient may affect improvement of the performance. Therefore, the pruning scheme corresponding to the gradient greater than zero is used to replace the pruning scheme corresponding to the gradient less than zero, to screen pruning schemes, and the performance of the to-be-optimized model corresponding to each screened pruning scheme is reevaluated.

In some embodiments, in order to facilitate the calculation of the degree of influence of the gradient on the performance, the screening can also be performed according to the magnitude of the gradient probability, as follows:

converting the gradient into a gradient probability by a Sigmoid function;

screening pruning schemes by replacing the pruning scheme of the to-be-optimized model with the gradient probability greater than a first threshold with the pruning scheme of the to-be-optimized model with the gradient probability less than a second threshold, where the first threshold is greater than the second threshold.

In some embodiments, after determining the initial evaluation performance of each to-be-optimized model, the gradient (gradient probability) of the mean values of the Gaussian process of each to-be-optimized model is firstly determined, and each pruning scheme is initially screened based on the gradient. According to each pruning scheme obtained after initial screening, the corresponding to-be-optimized model and the corresponding reevaluation performance are determined, the gradient of the mean value of the Gaussian process corresponding to each pruning scheme after the initial screening is further determined, and each pruning scheme is re-screened. The above process is repeated until the number of iterations is reached.

3) According to the evaluation performance corresponding to each pruning scheme obtained after the last iteration is completed, the evaluation performance of each to-be-optimized model is determined.

Figure 9:
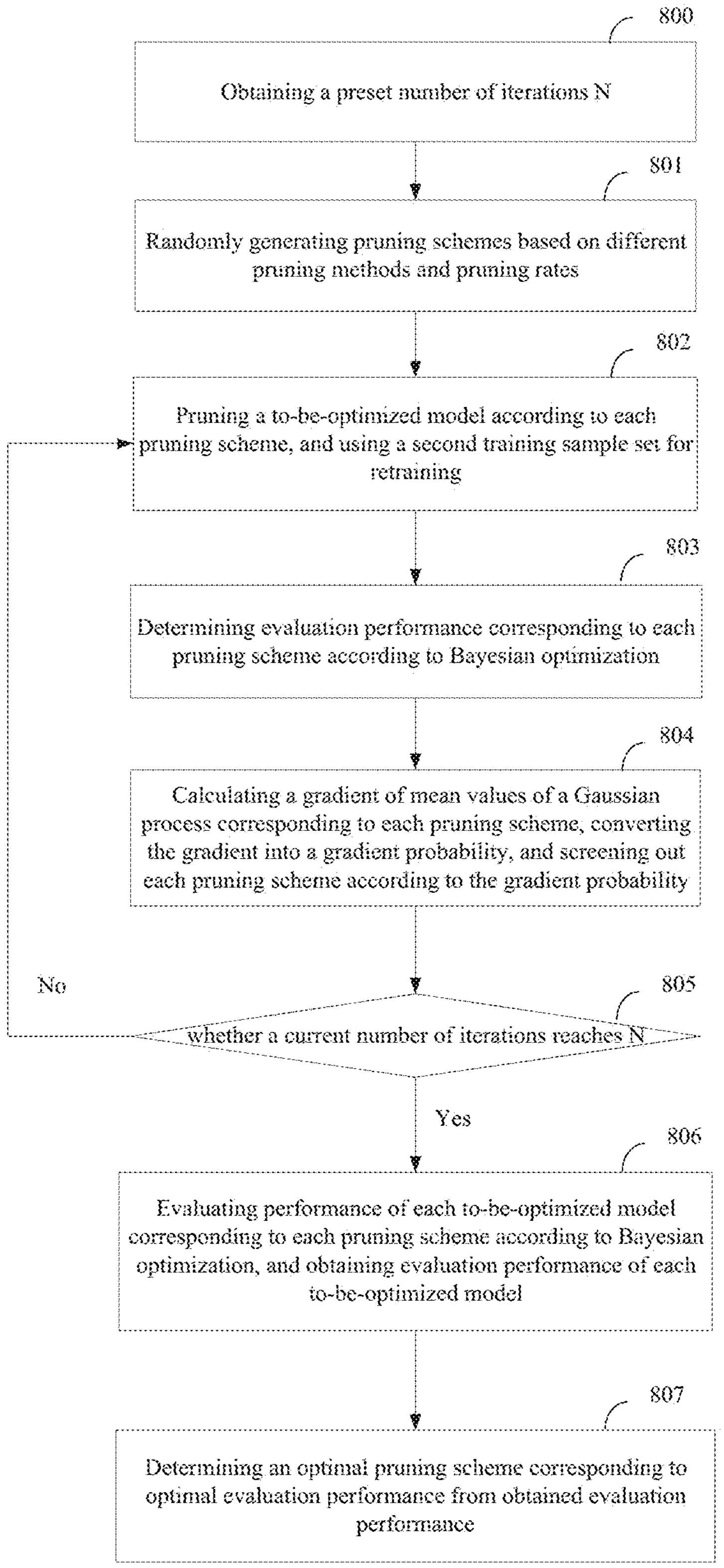
FIG. 9 is an implementation flowchart of an iterative screening of a pruning scheme according to an embodiment of the present disclosure.

In order to describe the screening process of the pruning schemes, as shown in FIG. 9, this embodiment further provides an iterative screening process of the pruning schemes. The specific implementation process is as follows.

Step 800: obtaining a preset number of iterations N, N is greater than zero.

Step 801: randomly generating M pruning schemes based on different pruning methods and pruning rates, M is greater than zero.

Step 802: pruning a to-be-optimized model according to each pruning scheme, and using a second training sample set for retraining.

Step 803: determining evaluation performance corresponding to each pruning scheme according to Bayesian optimization.

Step 804: calculating a gradient of mean values of a Gaussian process corresponding to each pruning scheme, converting the gradient into a gradient probability, and screening out each pruning scheme according to the gradient probability.

Step 805: determining whether a current number of iterations reaches N, if the current number of iterations reaches N, proceeding to perform step 806: if the current number of iterations does not reach N, returning to perform step 802.

Step 806: evaluating performance of each to-be-optimized model corresponding to each pruning scheme according to Bayesian optimization, and obtaining evaluation performance of each to-be-optimized model.

Step 807: determining an optimal pruning scheme corresponding to optimal evaluation performance from obtained evaluation performance.

In implementation, the screening process of the pruning schemes is mainly implemented by a controller and an evaluator. First, the controller is configured to randomly generate a plurality of (M kinds of, M>=10000) pruning schemes, and then the evaluator evaluates performance (speed and accuracy) of the pruning schemes to provide guidance for the controller to generate better pruning schemes. Afterwards, the controller generates new pruning schemes according to the guidance, and after multiple rounds (N rounds, N<=100) of iterations, the controller outputs an optimal pruning scheme that satisfies both speed and accuracy requirements. The controller may generate a new pruning scheme according to the gradient probability output from the evaluator. In the potentially optimal pruning scheme, it is determined whether to replace the pruning scheme according to the gradient probability of each pruning scheme corresponding to the gradient. The pruning scheme with higher gradient probability may be replaced by the pruning scheme with lower gradient probability.

Since the evaluation for each pruning scheme requires pruning the to-be-optimized model and retraining the to-be-optimized model, resulting in high time cost, Bayesian optimization (BO) is introduced to optimize and speed up the evaluation. After obtaining a plurality of pruning schemes from the controller, the evaluator may select some pruning schemes that are relatively more likely to have the best performance for evaluation, and the remaining pruning schemes with less potential may not be evaluated. The purpose of optimizing the detection evaluation process is achieved by reducing the number of actual evaluations. To deal with the discontinuity of pruning schemes, a dedicated Gaussian Process (GP) can also be built for Bayesian optimization. In this embodiment, the gradient of mean values of the Gaussian process (GP) is used to guide the update of the pruning scheme. In order to use the gradient more intuitively, this embodiment further convert the gradient into a gradient probability through a negative gradient sigmoid function, and a pruning scheme corresponding to a high gradient probability is more likely to be replaced by a pruning scheme corresponding to a low gradient probability.

It should be noted that the method of pruning the model parameters in the to-be-optimized model through the optimal pruning scheme in this embodiment, and the method of obtaining the optimal pruning scheme can also be applied to optimization of other network models. For example, the pruning scheme in this embodiment can be used for optimizing a feature extraction model, a face definition model, a key point positioning model, etc., improving the inference speed of the model. The optimization method of the pruning scheme in this embodiment can be aimed at different network structures for optimization. The optimization can be set according to actual requirements, which is not limited too much in this embodiment.

Some embodiments of the present disclosure further provide a method for branch optimization, which is used for parallel optimization with combination of GPU and CPU, counting computational complexity of each branch of the target detection model, and prioritizing branches with higher computational complexity to be executed in the GPU, and branches with lower complexity to be executed in the CPU, and actually evaluating the inference synthesis speed of the target detection model under different configurations through pre-inference, and selecting the configuration achieving the top speed as the actual execution configuration.

During implementation, the branch optimization can be performed by:

determining a calculation amount of each network layer in the target detection model; using a graphics processing unit, GPU, to process data of the network layer with the calculation amount higher than a data threshold, and using a central processing unit, CPU, to process data of the network layer with the calculation amount not higher than the data threshold.

Optionally, the data of an upper network layer in the target detection model is processed through the CPU, and the data of a lower network layer in the target detection model is processed through the GPU, because in the target detection model, closer to the upper layer the network layer is, less data the network layer processes, closer to the lower layer the network layer is, more data the network layer processes. The data with high computational complexity is executed in the GPU, and the data with low computational complexity is executed in the CPU, improving the inference speed of the actual running target detection model.

In some embodiments, after the coordinates of the object in the image and the category of the object are determined through the above target detection model, the obtained image can be further processed, including any or any combination of following processing schemes.

Scheme 1: Screening out an image including the object with a largest size from images in which the category belongs to a preset category.

Scheme 2: Screening out an image including the object with a highest definition from images in which the category belongs to a preset category and a size of the object is larger than a size threshold.

Scheme 3: Screening out an image including the object with a highest definition from images in which the category belongs to a preset category.

Scheme 4: Screening out an image including the object with a largest size from images in which the category belongs to a preset category and a definition of the object is greater than a definition threshold.

During implementation, among a plurality of detected images including the same object, the image including the object with the largest object size and/or the highest definition can be further screened out for subsequent feature extraction to improve the accuracy of feature extraction.

In some embodiments, after screening out the image that meets requirements from the plurality of detected images including the same object, the object in the image is further aligned. If the object is a human face, the face alignment is performed by:

obtaining position information of each key point of the object in the screened image according to a preset key point: aligning the object in the screened image according to the position information: extracting features from the aligned image to obtain features of the object.

Here, the key point is used to represent each key point of the face, and the alignment process is used to process the image of the object (face) that does not meet requirements of a front face as an image of the front face, further improving the accuracy of feature extraction, to provide a strong guarantee for the subsequent use of the extracted features.

Embodiments of the present disclosure use a specially designed lightweight network as the backbone network of the target detection model, and through a plurality of pruning schemes obtained by combining a plurality of pruning methods and pruning rates, the inference speed of the target detection model is improved by significantly reducing the amount of model parameters under a premise that the accuracy is maintained without decreasing, the inference speed of the target detection model is further improved through branch optimization, and the accuracy of feature extraction and the speed of feature extraction are further improved through screening and aligning the detected image during the process of feature extraction.

Based on the same inventive concept, some embodiments of the present disclosure further provide an optimized target detection device, since the device is the device in the method in embodiments of the present disclosure, and the principle of solving the problem of the device is similar to the method, the implementation of the device may refer to the implementation of the method, and repeated descriptions will be omitted.

Figure 10:
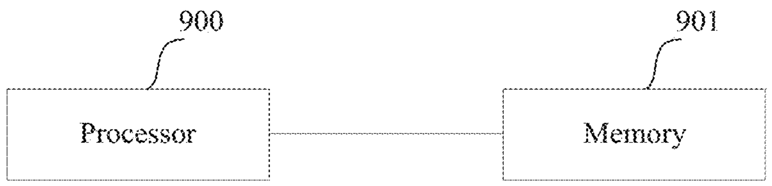
FIG. 10 is a schematic diagram of an optimized target detection device according to an embodiment of the present disclosure.

As shown in FIG. 10, the optimized target detection device includes a processor 900 and a memory 901. The memory 901 is configured to store a program executable by the processor 900, and the processor 900 is configured to read the program in the memory 901 and perform steps of:

inputting an image including an object into a trained target detection model for detection, and determining coordinates of the object in the image and a category of the object;

where the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set, where the optimal pruning scheme is obtained by screening pruning schemes determined according to different pruning methods and pruning rates.

As an optional embodiment, before inputting the image including the object into the trained target detection model for detection, the processor is further configured to perform:

decoding an obtained video stream including the object to obtain frames of images including the object in three-channel RGB format; or performing format conversion on an obtained unprocessed image including the object to obtain an image including the object in RGB format.

As an optional embodiment, before inputting the image including the object into the trained target detection model for detection, the processor is further configured to perform:

under a condition of maintaining an original ratio of the image, normalizing a size of the image to obtain an image of a preset size.

As an optional embodiment, the processor is configured to perform:

inputting the image including the object into the trained target detection model for detection, and obtaining coordinates of each candidate frame of the object in the image and a confidence degree of a category corresponding to each candidate frame;

screening out each preferred candidate frame with a confidence degree greater than a threshold from candidate frames;

determining the coordinates of the object in the image according the coordinates of each preferred candidate frame, and determining the category of the object according to the category corresponding to each preferred candidate frame.

As an optional embodiment, the processor is configured to perform:

screening out an optimal candidate frame from preferred candidate frames according to a Non-Maximum Suppression, NMS, method;

determining coordinates of the optimal candidate frame as the coordinates of the object in the image, and determining a category corresponding to the optimal candidate frame as the category of the object.

As an optional embodiment, when the image including the object is normalized in size and then input to the trained target detection model for detection, before determining the coordinates of the optimal candidate frame as the coordinates of the object in the image, the processor is further configured to perform:

converting the coordinates of the optimal candidate frame into a coordinate system of the image before normalization, and determining coordinates obtained after conversion as the coordinates of the optimal candidate frame.

As an optional embodiment, the target detection model includes a backbone network, a neck network and a head network.

The backbone network is configured to extract features of the image. The backbone network includes a plurality of depthwise convolutional network layers and a plurality of unit convolutional network layers. The depthwise convolutional network layers are symmetrically distributed at head and tail of the backbone network. The unit convolutional network layers are distributed in the middle of the backbone network.

The neck network is configured to perform feature fusion on features extracted by the backbone network to obtain a fused feature map.

The head network is configured to detect an object in the fused feature map to obtain coordinates of the object in the image and a category of the object.

As an optional embodiment, a data volume of training samples in the second training sample set is smaller than a data volume of training samples in the first training sample set.

As an optional embodiment, the pruning method includes at least one of block pruning, structured pruning, or unstructured pruning.

As an optional embodiment, the processor is configured to perform:

- pruning model parameters corresponding to at least one network layer in the to-be-optimized model using the optimal pruning scheme.

As an optional embodiment, the processor is further configured to determine the optimal pruning scheme by:

- determine pruning schemes based on different pruning methods and pruning rates;
- evaluating performance of each to-be-optimized model corresponding to each pruning scheme separately according to Bayesian optimization, and obtaining evaluation performance of each to-be-optimized model;
- determining the optimal pruning scheme corresponding to optimal evaluation performance from obtained evaluation performance.

As an optional embodiment, the processor is configured to perform:

- initially evaluating the performance of each to-be-optimized model corresponding to each pruning scheme according to Bayesian optimization, and obtaining initial evaluation performance of each to-be-optimized model;
- screening each pruning scheme according to a preset number of iterations, and a degree of influence of a gradient of mean values of a Gaussian process obeyed by each to-be-optimized model on performance, and reevaluating performance of each to-be-optimized model corresponding to each screened pruning scheme;
- determining the evaluation performance of each to-be-optimized model according to the evaluation performance corresponding to each pruning scheme obtained after a last iteration is completed.

As an optional embodiment, the processor is configured to perform:

- converting the gradient into a gradient probability;
- screening pruning schemes by replacing the pruning scheme of the to-be-optimized model with the gradient probability greater than a first threshold with the pruning scheme of the to-be-optimized model with the gradient probability less than a second threshold, where the first threshold is greater than the second threshold.

As an optional embodiment, the processor is further configured to perform:

- determining a calculation amount of each network layer in the target detection model;
- using a Graphic Processing Unit, GPU, to process a data of the network layer with the calculation amount higher than a data threshold, and using a Central Processing Unit, CPU, to process data of the network layer with the calculation amount not higher than the data threshold.

As an optional embodiment, after determining the coordinates of the object in the image and the category of the object, the processor is further configured to perform:

- screening out an image including the object with a largest size from images in which the category belongs to a preset category; or,
- screening out an image including the object with a highest definition from images in which the category belongs to a preset category and a size of the object is larger than a size threshold; or,
- screening out an image including the object with a highest definition from images in which the category belongs to a preset category; or,
- screening out an image including the object with a largest size from images in which the category belongs to a preset category and a definition of the object is greater than a definition threshold.

As an optional embodiment, the processor is further configured to perform:

- obtaining position information of each key point of the object in the screened image according to a preset key point;
- aligning the object in the screened image according to the position information;
- extracting features from the aligned image to obtain features of the object.

Based on the same inventive concept, some embodiments of the present disclosure further provide an optimized target detection apparatus. Since the device is the device in the method in embodiments of the present disclosure, and the principle of solving the problem of the device is similar to the method, therefore the implementation of the device may refer to the implementation of the method, and repeated descriptions will not be omitted.

Figure 11:
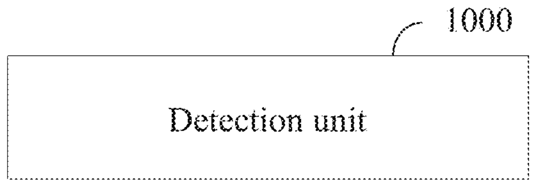
FIG. 11 is a schematic diagram of an optimized target detection apparatus according to an embodiment of the present disclosure.

As shown in FIG. 11, the apparatus includes:

- a detection unit 1000, configured to input an image including an object into a trained target detection model for detection, and determine coordinates of the object in the image and a category of the object;
- where the target detection model includes a plurality of depthwise convolutional network layers, and the target detection model is obtained by: training using a first training sample set to obtain a to-be-optimized model, pruning model parameters in the to-be-optimized model using an optimal pruning scheme, and training the pruned to-be-optimized model using a second training sample set: where the optimal pruning scheme is obtained by screening pruning schemes determined according to different pruning methods and pruning rates.

As an optional embodiment, before inputting the image including the object into the trained target detection model for detection, the apparatus further includes a conversion unit configured to:

- decode an obtained video stream including the object to obtain frames of images including the object in three-channel RGB format; or, perform format conversion on an obtained unprocessed image including the object to obtain an image including the object in RGB format.

As an optional embodiment, before inputting the image including the object into the trained target detection model for detection, the apparatus further includes a normalization unit configured to:

under a condition of maintaining an original ratio of the image, normalize a size of the image to obtain an image of a preset size.

As an optional embodiment, the detection unit is configured to:

input the image including the object into the trained target detection model for detection, and obtain coordinates of each candidate frame of the object in the image and a confidence degree of the category corresponding to each candidate frame;

screen out each preferred candidate frame with a confidence degree greater than a threshold from candidate frames;

determine the coordinates of the object in the image according to coordinates of each preferred candidate frame, and determine the category of the object according to the category corresponding to each preferred candidate frame.

As an optional embodiment, the detection unit is configured to:

screen out an optimal candidate frame from preferred candidate frames according to a Non-Maximum Suppression, NMS, method;

determine coordinates of the optimal candidate frame as the coordinates of the object in the image, and determine a category corresponding to the optimal candidate frame as the category of the object.

As an optional embodiment, when the image including the object is normalized in size and then input into the trained target detection model for detection, before determining the coordinates of the optimal candidate frame as the coordinates of the object in the image, the conversion unit is further configured to:

convert the coordinates of the optimal candidate frame into a coordinate system of the image before normalization, and determine coordinates obtained after conversion as the coordinates of the optimal candidate frame.

As an optional embodiment, the target detection model includes a backbone network, a neck network and a head network.

The backbone network is configured to extract the features of the image. The backbone network includes a plurality of depthwise convolutional network layers and a plurality of unit convolutional network layers. The depthwise convolutional network layers are symmetrically distributed at head and tail of the backbone network, the unit convolutional network layers are distributed in middle of the backbone network.

The neck network is configured to perform feature fusion on features extracted by the backbone network to obtain a fused feature map.

The head network is used to detect an object in the fused feature map to obtain coordinates of the object in the image and a category of the object.

As an optional embodiment, a data volume of training samples in the second training sample set is smaller than a data volume of training samples in the first training sample set.

As an optional embodiment, the pruning method includes at least one of block pruning, structured pruning, or unstructured pruning.

As an optional embodiment, the detection unit is configured to:

prune model parameters corresponding to at least one network layer in the to-be-optimized model by using the optimal pruning scheme.

As an optional embodiment, the detection unit is configured to determine the optimal pruning solution by:

determining pruning schemes based on different pruning methods and pruning rates;

evaluating performance of each to-be-optimized mode corresponding to each pruning scheme separately according to Bayesian optimization, and obtaining evaluation performance of each to-be-optimized model;

determine the optimal pruning scheme corresponding to the optimal evaluation performance from obtained evaluation performance.

As an optional embodiment, the detection unit is configured to:

initially evaluate the performance of each to-be-optimized model corresponding to each pruning scheme according to Bayesian optimization, and obtain initial evaluation performance of each to-be-optimized model;

screen each pruning scheme according to a preset number of iterations, and a degree of influence of a gradient of mean values of a Gaussian process obeyed by each to-be-optimized model on performance, and reevaluate performance of each to-be-optimized model corresponding to each screened pruning scheme;

determine the evaluation performance of each to-be-optimized model according to the evaluation performance corresponding to each pruning scheme obtained after a last iteration is completed.

As an optional embodiment, the detection unit is configured to:

convert the gradient into a gradient probability;

screen pruning schemes by replacing the pruning scheme of the to-be-optimized model with the gradient probability greater than a first threshold with the pruning scheme of the to-be-optimized model with the gradient probability less than a second threshold, where the first threshold is greater than the specified the second threshold.

As an optional embodiment, the apparatus further includes a branch unit configured to:

determine a calculation amount of each network layer in the target detection model;

use a Graphics Processing Unit, GPU, to process data of the network layer with the calculation amount higher than a data threshold, and use a Central Processing Unit, CPU, to process data of the network layer with the calculation amount not higher than the data threshold.

As an optional embodiment, after determining the coordinates of the object in the image and the category of the object, the apparatus further includes a screening unit configured to:

screen out an image including the object with a largest size from images in which the category belongs to a preset category; or, screen out an image including the object with a highest definition from images in which the category belongs to a preset category and a size of the object is larger than a size threshold; or, screen out an image including the object with a highest definition from images in which the category belongs to a preset category; or, screen out an image including the object with a largest size from images in which the category belongs to a preset category and a definition of the object is greater than a definition threshold.

As an optional embodiment, the apparatus further includes an alignment unit configured to:

obtain position information of each key point of the object in the screened image according to a preset key point;

align the object in the screened image according to the position information;

extract features from the aligned image to obtain features of the object.

Those skilled in the art should understand that embodiments of the present disclosure may be provided as methods, systems, or computer program products. Accordingly, the present disclosure can take the form of an entire hardware embodiment, an entire software embodiment, or an embodiment combining software and hardware aspects. Furthermore, the present disclosure may take the form of a computer program product embodied on one or more computer-usable storage media (including but not limited to disk storage, CD-ROM, optical storage, etc.) having computer-usable program code embodied therein.

The present disclosure is described with reference to flowchart illustrations and/or block diagrams of methods, apparatus (systems), and computer program products according to embodiments of the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing equipment to produce a machine such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including instruction means. The instruction device realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thereby the instructions provide steps for implementing the functions specified in the flow chart or blocks of the flowchart and/or the block or blocks of the block diagrams.

While embodiments of the present disclosure have been described, additional changes and modifications can be made to these embodiments by those skilled in the art once the basic inventive concept is appreciated. Therefore, it is intended that the appended claims be construed to cover embodiments and all changes and modifications which fall within the scope of the present disclosure.

Apparently, those skilled in the art can make various changes and modifications to embodiments of the present disclosure without departing from the spirit and scope of embodiments of the present disclosure. In this way, if these modifications and variations of embodiments of the present disclosure fall within the scope of the claims of the present disclosure and their equivalent technologies, the present disclosure also intends to include these modifications and variations.

What is claimed is:

1. An optimized target detection method, comprising:

inputting an image comprising an object into a trained target detection model for detection, and determining coordinates of the object in the image and a category of the object;

wherein the trained target detection model comprises a plurality of depthwise convolutional network layers, and the trained target detection model is obtained by: training using a first training sample set to obtain a to-be-optimized model, pruning model parameters in the to-be-optimized model using an optimal pruning scheme, and training the pruned to-be-optimized model using a second training sample set; wherein the optimal pruning scheme is obtained by screening pruning schemes determined according to different pruning methods and pruning rates;

wherein the optimal pruning scheme is determined by:

determining pruning schemes based on different pruning methods and pruning rates;

evaluating performance of each to-be-optimized model corresponding to each pruning scheme separately according to Bayesian optimization, and obtaining evaluation performance of each to-be-optimized model;

determining the optimal pruning scheme corresponding to optimal evaluation performance from obtained evaluation performance;

wherein the evaluating the performance of each to-be-optimized model corresponding to each pruning scheme separately according to Bayesian optimization, and obtaining the evaluation performance of each to-be-optimized model, comprises:

initially evaluating the performance of each to-be-optimized model corresponding to each pruning scheme according to Bayesian optimization, and obtaining initial evaluation performance of each to-be-optimized model;

screening each pruning scheme according to a preset number of iterations, and a degree of influence of a gradient of mean values of a Gaussian process obeyed by each to-be-optimized model on performance, and reevaluating performance of each to-be-optimized model corresponding to each screened pruning scheme;

determining the evaluation performance of each to-be-optimized model according to the evaluation performance corresponding to each pruning scheme obtained after a last iteration is completed;

wherein the screening each pruning scheme according to the degree of influence of gradient of the mean values of the Gaussian process obeyed by each to-be-optimized model on performance, comprises:

converting the gradient into a gradient probability;

screening pruning schemes by replacing the pruning scheme of the to-be-optimized model with the gradient probability greater than a first threshold with the pruning scheme of the to-be-optimized model with the gradient probability less than a second threshold, wherein the first threshold is greater than the second threshold.

2. The method according to claim 1, wherein before the inputting the image comprising the object into the trained target detection model for detection, the method further comprises:

decoding an obtained video stream comprising the object to obtain frames of images comprising the object in three-channel RGB format; or, performing format conversion on an obtained unprocessed image comprising the object to obtain an image comprising the object in RGB format.

3. The method according to claim 1, wherein before the inputting the image comprising the object into the trained target detection model for detection, the method further comprises:

under a condition of maintaining an original ratio of the image, normalizing a size of the image to obtain an image of a preset size.

4. The method according to claim 1, wherein the inputting the image comprising the object into the trained target detection model for detection, and determining the coordinates of the object in the image and the category of the object, comprises:

inputting the image comprising the object into the trained target detection model for detection, and obtaining coordinates of each candidate frame of the object in the image and a confidence degree of a category corresponding to each candidate frame;

screening out each preferred candidate frame with a confidence degree greater than a threshold from candidate frames;

determining the coordinates of the object in the image according to coordinates of each preferred candidate frame, and determining the category of the object according to a category corresponding to each preferred candidate frame.

5. The method according to claim 4, wherein the determining the coordinates of the object in the image according to the coordinates of each preferred candidate frame, and determining the category of the object according to the category corresponding to each preferred candidate frame, comprises:

screening out an optimal candidate frame from preferred candidate frames according to a Non-Maximum Suppression, NMS, method;

determining coordinates of the optimal candidate frame as the coordinates of the object in the image, and determining a category corresponding to the optimal candidate frame as the category of the object.

6. The method according to claim 5, wherein, when the image comprising the object is normalized in size and then input into the trained target detection model for detection, before the determining the coordinates of the optimal candidate frame as the coordinates of the object in the image, the method further comprises:

converting the coordinates of the optimal candidate frame into a coordinate system of the image before normalization, and determining coordinates obtained after conversion as the coordinates of the optimal candidate frame.

7. The method according to claim 1, wherein the trained target detection model comprises a backbone network, a neck network, and a head network, wherein:

the backbone network is configured to extract features of the image, the backbone network comprises a plurality of depthwise convolutional network layers and a plurality of unit convolutional network layers, wherein the depthwise convolutional network layers are symmetrically distributed at head and tail of the backbone network, the unit convolutional network layers are distributed in middle of the backbone network;

the neck network is configured to perform feature fusion on features extracted by the backbone network to obtain a fused feature map;

the head network is configured to detect an object in the fused feature map to obtain coordinates of the object in the image and a category of the object.

8. The method according to claim 1, wherein a data volume of training samples in the second training sample set is smaller than a data volume of training samples in the first training sample set.

9. The method according to claim 1, wherein the pruning method comprises at least one of block pruning, structured pruning, or unstructured pruning.

10. The method according to claim 1, wherein the pruning the model parameters in the to-be-optimized model using the optimal pruning scheme, comprises:

pruning model parameters corresponding to at least one network layer in the to-be-optimized model using the optimal pruning scheme.

11. The method according to claim 1, further comprising:

determining a calculation amount of each network layer in the trained target detection model;

using a Graphics Processing Unit, GPU, to process data of the network layer with the calculation amount higher than a data threshold, and using a Central Processing Unit, CPU, to process data of the network layer with the calculation amount not higher than the data threshold.

12. The method according to claim 1, wherein after the determining the coordinates of the object in the image and the category of the object, the method further comprising:

screening out an image comprising the object with a largest size from images in which the category belongs to a preset category; or, screening out an image comprising the object with a highest definition from images in which the category belongs to a preset category and a size of the object is larger than a size threshold; or, screening out an image comprising the object with a highest definition from images in which the category belongs to a preset category; or, screening out an image comprising the object with a largest size from images in which the category belongs to a preset category and a definition of the object is greater than a definition threshold.

13. The method according to claim 12, further comprising:

obtaining position information of each key point of the object in the screened image according to a preset key point;

aligning the object in the screened image according to the position information;

extracting features from the aligned image to obtain features of the object.

14. An optimized target detection device, comprising a processor and a memory, the memory is configured to store a program executable by the processor, and the processor is configured to read the program in the memory and perform steps of the method according to claim 1.

15. A non-transitory computer storage medium, storing a computer program thereon, wherein the computer program, when being executed by a processor, implements steps of the method according to claim 1.

* * * * *